(12) United States Patent  
Randhawa et al.

(10) Patent No.: US 9,158,714 B2
(45) Date of Patent: Oct. 13, 2015

(54) METHOD AND SYSTEM FOR MULTI-LAYER DIFFERENTIAL LOAD BALANCING IN TIGHTLY COUPLED CLUSTERS

(75) Inventors: Amarinder Singh Randhawa, Sunnyvale, CA (US); Madhav Buddhi, Sunnyvale, CA (US); Chaitanya Yalamanchili, Sunnyvale, CA (US); Prasanta Dash, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 277 days.

(21) Appl. No.: 13/363,288

(22) Filed: Jan. 31, 2012

(65) Prior Publication Data

US 2013/0198424 A1  Aug. 1, 2013

(51) Int. Cl.
  G06F 3/00 (2006.01)
  G06F 13/12 (2006.01)
  G06F 13/38 (2006.01)
  G06F 12/00 (2006.01)
  G06F 15/167 (2006.01)
  G06F 15/173 (2006.01)
  G06F 13/14 (2006.01)

(52) U.S. Cl.
  CPC ........................................ *G06F 13/14* (2013.01)

(58) Field of Classification Search
  CPC ............... G06F 3/067; G06F 3/0635; G06F 2206/1012; G06F 3/0613; G06F 3/061; G06F 3/0631; G06F 3/0647; G06F 13/14; G06F 11/3433; G06F 11/3409; G06F 3/0611; G06F 3/0653; G06F 3/0629; G06F 2009/45579; G06F 2206/1508; G06F 3/0614

USPC .......... 710/74, 15, 19, 62; 711/103, 114, 162; 709/224, 213, 241–242

See application file for complete search history.

(56) References Cited

U.S. PATENT DOCUMENTS

| 6,256,675 | B1 * | 7/2001 | Rabinovich ................... 709/241 |
|---|---|---|---|
| 6,314,460 | B1 * | 11/2001 | Knight et al. ................... 709/220 |
| 6,629,264 | B1 * | 9/2003 | Sicola et al. ................... 714/15 |
| 7,275,103 | B1 * | 9/2007 | Thrasher et al. ............... 709/224 |
| 7,624,241 | B2 * | 11/2009 | Eguchi et al. ................... 711/162 |
| 7,870,335 | B2 * | 1/2011 | Lubbers et al. ................ 711/114 |
| 2003/0069972 | A1 * | 4/2003 | Yoshimura et al. ............ 709/226 |
| 2003/0187945 | A1 * | 10/2003 | Lubbers et al. ................ 709/213 |
| 2005/0271061 | A1 * | 12/2005 | Nguyen et al. ............ 370/395.52 |
| 2007/0070975 | A1 * | 3/2007 | Otani et al. .................... 370/351 |
| 2010/0100664 | A1 * | 4/2010 | Shimozono ................... 711/103 |
| 2010/0287306 | A1 * | 11/2010 | Matsuda ....................... 709/242 |
| 2013/0159998 | A1 * | 6/2013 | Cawlfield et al. ................. 718/1 |

* cited by examiner

*Primary Examiner* — Farley Abad
*Assistant Examiner* — Henry Yu
(74) *Attorney, Agent, or Firm* — Wilmer Cutler Pickering Hale and Dorr LLP

(57) ABSTRACT

A method and system for load balancing. The method includes discovering each of a plurality of hosts in a cluster, wherein the plurality of hosts is configured for accessing a LUN of a storage system through a storage network fabric. Global input/output (I/O) load characteristics are collected for each of the plurality of hosts at the device and/or volume level. A selected host is determined for processing an I/O originating at the local host, wherein the host is selected based on a current set of the global I/O load characteristics.

21 Claims, 7 Drawing Sheets

METHOD AND SYSTEM FOR MULTI-LAYER DIFFERENTIAL LOAD BALANCING IN TIGHTLY COUPLED CLUSTERS

BACKGROUND

Near continuous access to data files on enterprise storage arrays is always desired. In a cluster environment, one or more nodes is capable of accessing a storage array through one or more paths. Load balancing of input/output messages (I/Os) across local paths is performed at each node. That is, traditionally, multi-pathing operations are performed at a node to perform load balancing across local paths providing connectivity between the individual node and the storage system.

Load balancing across all nodes opens up more options for delivering I/Os throughout a cluster, but it offers more challenges. For instance, cluster wide load balancing may be performed at the storage array itself. That is, the load is balanced across the array controllers used for accessing the storage array, such as, when the array is in an active/active configuration. However, this may not serve as the best place to perform cluster-wide load balancing as the storage array does not serve as application host, and as such, it is difficult to solve the affinity/configuration asymmetry between different application at the storage array layer.

Performing load balancing only at a local node level of a cluster leads to an underperforming cluster used for accessing a storage system.

SUMMARY

Systems and methods of load balancing I/Os originating at a host. In one embodiment, a computer implemented method for load balancing is disclosed and includes discovering each of a plurality of hosts in a cluster, wherein the plurality of hosts is configured for accessing a LUN of a storage system through a storage network fabric. Global input/output (I/O) load characteristics are collected for each of the plurality of hosts at the device and/or volume level. A selected host is determined for processing an I/O originating at the local host, wherein the host is selected based on a current set of the global I/O load characteristics.

In some embodiments, a system includes a tangible, non-transitory computer-readable storage medium having stored thereon, computer-executable instructions that, when executed causes the computer system to perform a method for load balancing. The method for load balancing includes discovering each of a plurality of hosts in a cluster, wherein the plurality of hosts is configured for accessing a LUN of a storage system through a storage network fabric. The plurality of hosts is discovered at the device and/or volume level of a local host, wherein the volume manager is aware of all hosts in the cluster. Global input/output (I/O) load characteristics are collected for each of the plurality of hosts at the device and/or volume level. The I/O load characteristics take into consideration each of the host's configuration, current workload, availability and performance requirements of a requesting application, resource overheads, etc. A selected host is determined for processing an I/O originating at the local host, wherein the host is selected based on a current set of the global I/O load characteristics.

In one embodiment, a computer system comprises a processor coupled to memory having stored therein instructions that, if executed by the computer system, cause the computer to execute a method for load balancing. The method includes discovering each of a plurality of hosts in a cluster, wherein the plurality of hosts is configured for accessing a LUN of a storage system through a storage network fabric. Global input/output (I/O) load characteristics are collected for each of the plurality of hosts at the device and/or volume level. I/O load characteristics include differential cluster-wide statistics that drive load balancing. In particular, cluster-wide I/O load characteristics are collected in a delayed and amortized fashion (e.g., the delay ranging from a few seconds to a few minutes, etc.). A selected host is determined for processing an I/O originating at the local host, wherein the host is selected based on a current set of the global I/O load characteristics.

Thus, according to embodiments of the present disclosure, at a local host/node, load balancing is performed cluster-wide. Effective load balancing is performed at multiple layers including the multi-pathing driver and volume manager layers.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
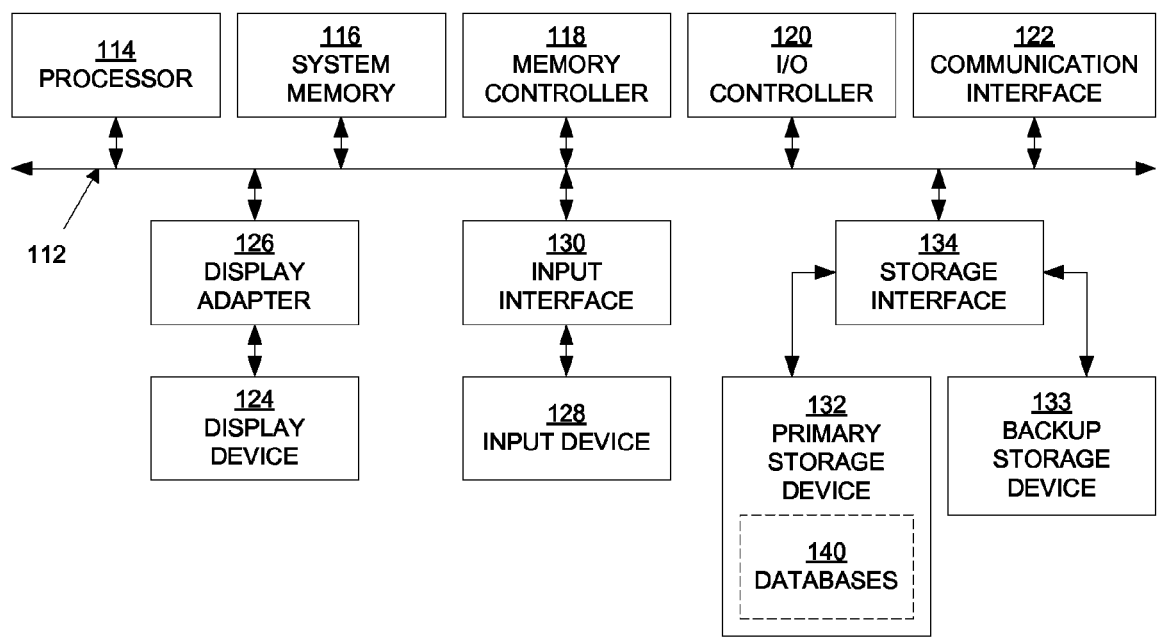
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "collecting," "determining," "selecting," "redirecting," "sending," "performing," or the like, refer to actions and processes (e.g., flowchart 5 of FIG. 5) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
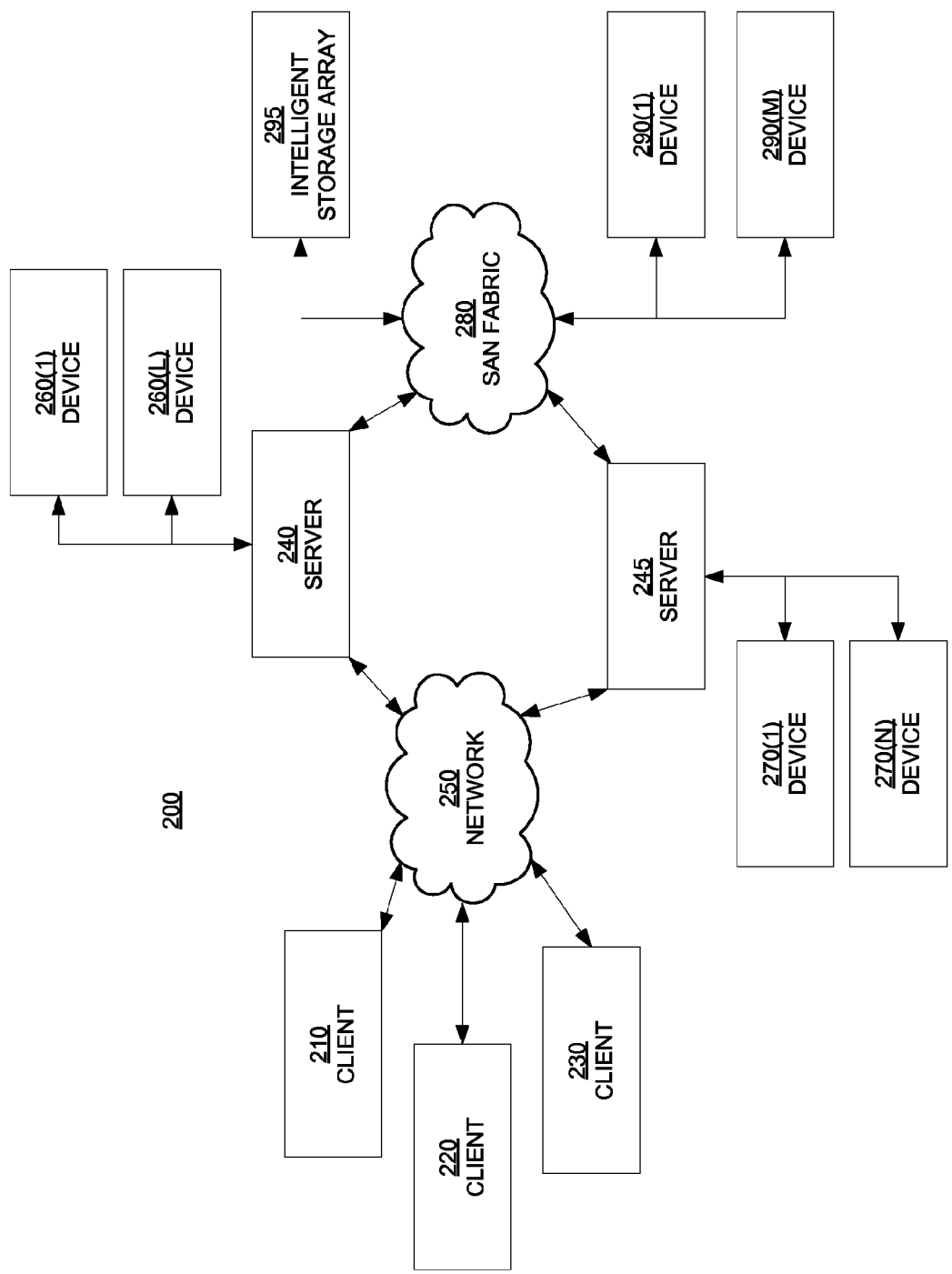
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1. In one embodiment, clients run on the server system, and wherein the server may include traffic direction functionality that performs load balancing.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a load balancing solution at various layers to include the multi-pathing and volume management layers. Other embodiments provide the above advantages and further provide for collecting delayed and amortized I/O load characteristics for hosts of a cluster, wherein the hosts are configured for accessing a LUN of a storage system. Still other embodiments provide the above advantages and further provide for application awareness that prioritizes latency sensitive I/Os by sending them to the host having the most favorable I/O characteristics. Embodiments of the present invention provide the above advantages and further provide for performing load balancing at the volume management level of a local host, and more particularly at a volume manager at the local host, wherein a volume at the volume management level is a logical entity build on top of LUNs exported by the storage system.

Embodiments of the present disclosure are described within the context of a data or file storage system. As previously described, the storage system provides for storing and organizing computer information, files and their data, for example within the storage devices of FIG. 2. In some embodiments, the file storage system supports a single user associated with a single computing system. In other embodiments, the file storage system supports a large enterprise including individuals (e.g., company, corporation, etc.). More particularly, the performance of multi-pathing operations by a multi-pathing driver of a local host is performed in relation to a logical unit number (LUN) of a storage system. The LUN may define a logical partitioning of a physical file system, in which LUNs are then grouped to form logical volumes upon which virtual disks are formed. In some systems, LUNs provide the necessary addressing for performing I/O operations, such as, reads, writes, etc.

Figure 3:
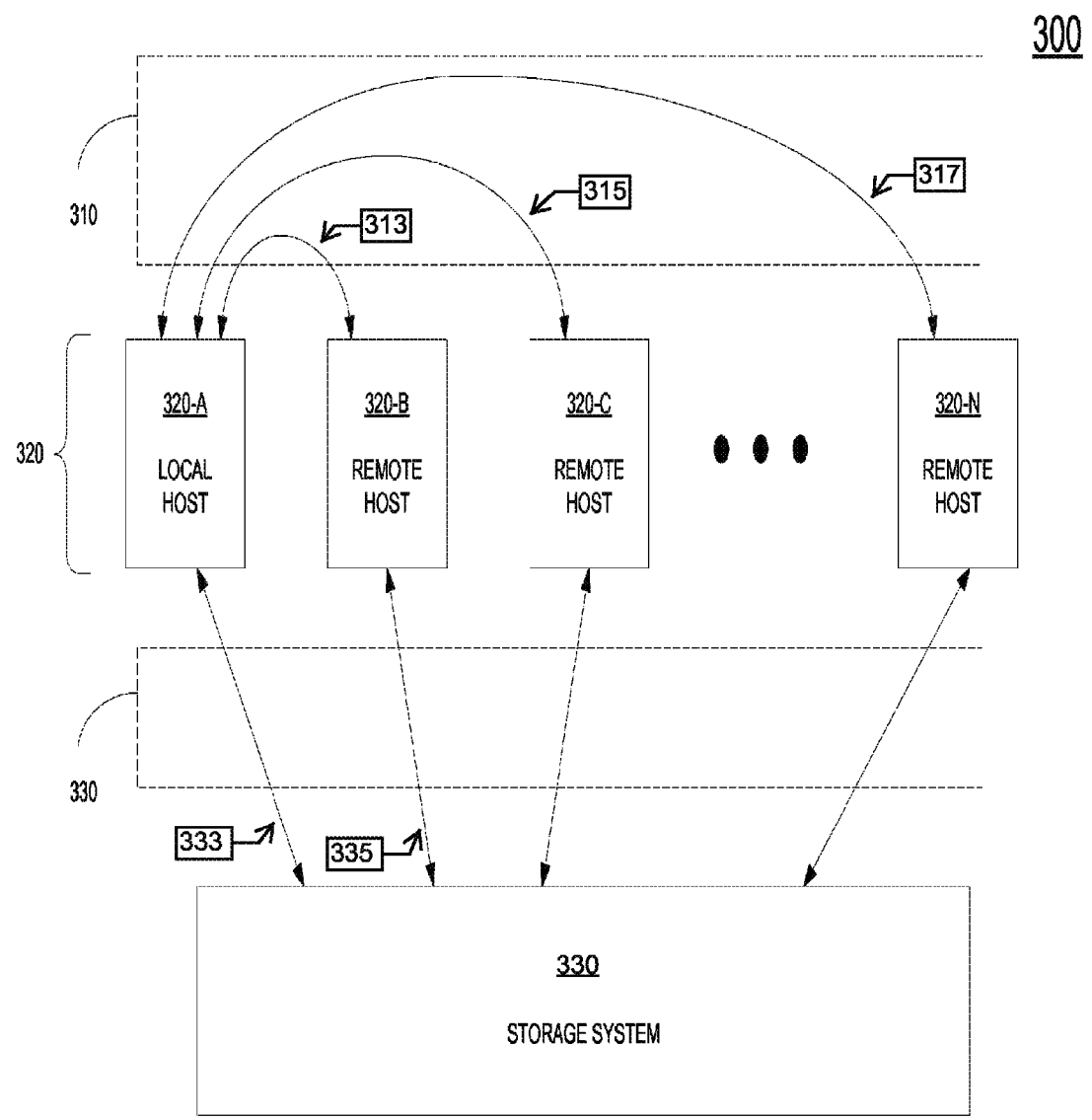
FIG. 3 is a data flow diagram depicting a the flow of input/output messages (I/Os) between a plurality of hosts and a storage system, in which an I/O is redirected from a local host to a remote host through load balancing, in accordance with one embodiment of the present disclosure.

FIG. 3 is a data flow diagram 300 depicting a the flow of input/output messages (I/Os) between a plurality of hosts and a storage system, in accordance with one embodiment of the present disclosure. In particular, the data flow diagram 300 illustrates the avoidance of the implementation of a cluster-wide failover protocol, when a failure condition occurs at a local host 320A.

As shown in FIG. 3, a storage system 330 is shown providing a dedicated network for accessing consolidated, block level data storage. For instance, in general, storage system 330 may be a storage area network (SAN) or other enterprise level storage system. The storage system presents one or more physical and/or logical disk arrays accessible to host servers so that the disk arrays appear like locally attached devices. For instance, disk arrays may be configured as internet small computer system interface (iSCSI) or SCSI devices that are visible as one or more LUNs, wherein the SAN consolidates the devices together through a high speed network.

As shown a plurality of hosts 320 is configured for accessing the storage system 330. That is, each of the hosts is configurable to access the storage system 330. The plurality of hosts is configured as a local host and one or more remote hosts, wherein each host is capable of being referenced as a local host 320A that is associated with one or more remote hosts 320B-N. For purposes of illustration, local host 320A is configured to access storage system 330 over one or more primary paths 333. In addition, remote host 320B is configured to access storage system 330 over one or more primary paths 335, and is further configured to handle I/Os originating from the local host 320A. Other remote hosts (320C-N) are also configured to access storage system 330 over one or more primary paths, and are further configured to handle I/Os originating from the local host.

More particularly, the hosts access the storage system through a highly performing storage network fabric 330. For instance, the storage system 330 may be accessible through a switched fabric topology (e.g., Fibre Channel switched fabric topology), wherein devices are communicatively coupled together through one or more Fibre Channel switches. The switches (not shown) form a mesh network with the plurality of hosts 320 forming the edges of the mesh network. The storage network fabric 330 is configurable for redundant operation, such that the storage system 330 is accessible even though connectivity through a primary path between a host and the storage system 300 has failed.

In embodiments of the present disclosure, local host 320A is also communicatively coupled over a secondary communication network 310 to other nodes or hosts in the cluster forming the plurality of hosts 320. For instance, local host 320A is coupled to remote host 320B over connection 313, and is coupled to remote host 320C over connection 315, and is coupled to remote host 320N over connection 317. In one embodiment, the secondary communication network 310 is an Ethernet/IP network.

Figure 4:
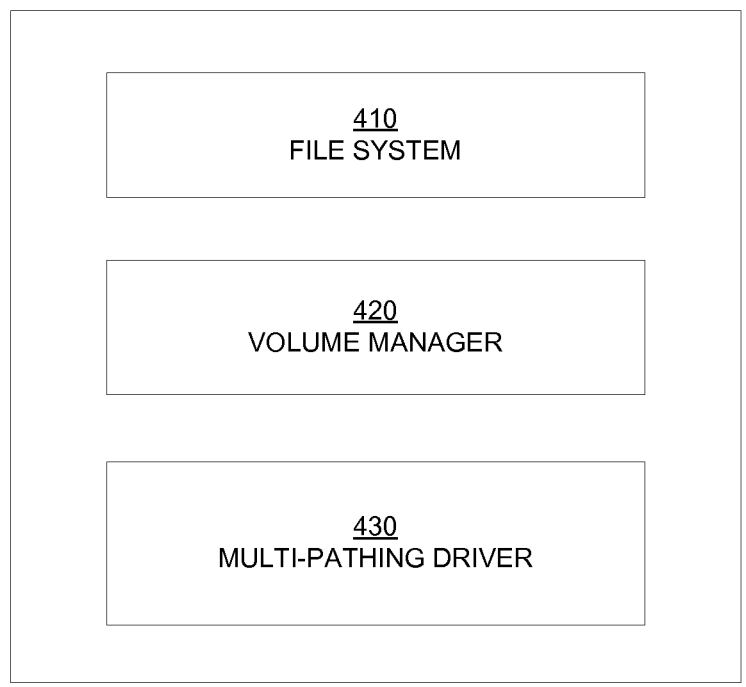
FIG. 4 is a block diagram illustrating a system capable redirecting I/Os from a local host to a remote host when performing load balancing, in accordance with one embodiment of the present disclosure.

FIG. 4 is a block diagram illustrating a host device 400 that is capable shipping or redirecting I/Os from a local host to a remote host when implementing a multi-layer load balancing protocol, in accordance with one embodiment of the present disclosure. In particular, the local host device is comprised of a volume manager 420, a multi-pathing driver 430, and a file system 410 that operate at different levels of awareness of remote hosts and local and remote paths to the underlying storage system (not shown). In one embodiment, FIG. 4 describes the high level components within an I/O subsystem.

In particular, file system 410 is configured to manage the file systems within the storage system that the host is accessing. For instance, file system 410 is able to recognize and/or manage the file systems within a particular LUN of the storage system that the host is accessing.

In addition, the multi-pathing driver 430 is configured to discover and manage the local paths that provide redundant connections to the underlying storage system. For instance, the multi-pathing driver 430 is able to determine the active and/or passive paths that provide primary and/or secondary access to the storage array from the host. Also, in an active/passive array configuration the active paths provide primary access to the storage system through a primary host controller and a primary array controller, and the passive paths provide secondary access to the storage system through a secondary host controller and a secondary array controller. In an active/active array configuration, both array controllers are active and capable of accessing the same LUN of a storage system at the same time or concurrently. As such, all paths through both array controllers used for accessing the same LUN are active paths.

Further, in one embodiment the volume manager 420 is more cluster aware than the multi-pathing driver 430. In particular, volume manager 420 provides a host based driver that is configured to discover the layout of storage access throughout a plurality of hosts. That is, the volume manager 420 is able to discover which hosts (e.g., local and remote) are able to access a particular LUN either through a primary array controller and/or through a secondary array controller. That information is used for performing load balancing at the volume manager 420, in embodiments of the present disclosure. While embodiments of the present invention are described and implemented within the context of a volume manager, other embodiments providing load balancing that includes shipping or redirecting I/Os from a local host to a remote host when implementing a multi-layer load balancing protocol are implemented within any cluster aware I/O subsystem (e.g., block device driver or file system).

Figure 5:
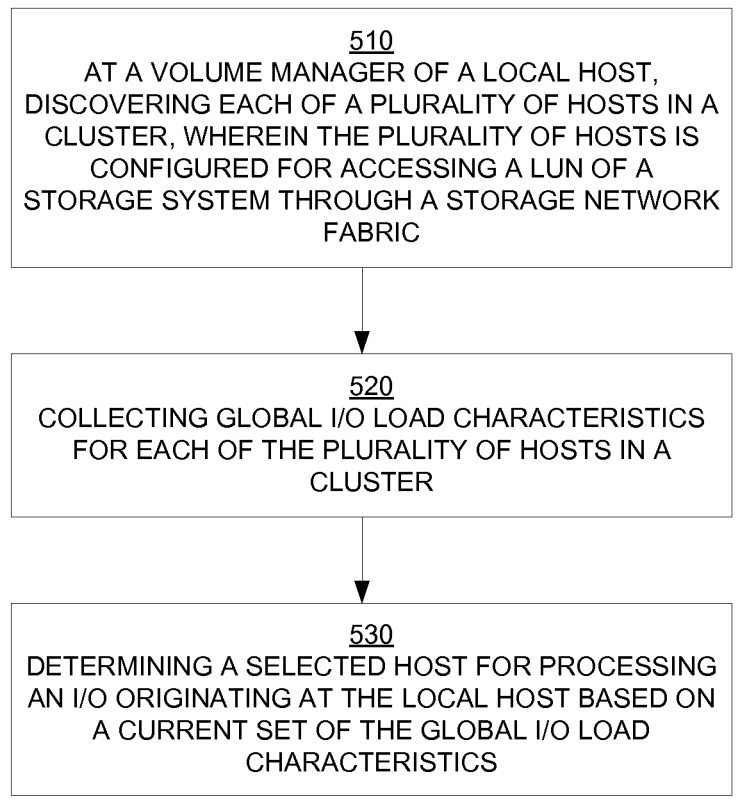
FIG. 5 is a flow diagram depicting a method for load balancing, wherein steps are outlined in which data is collected and propagated to different sub-systems for purposes of load balancing including redirecting an I/O from a local host to a remote host based on global I/O load characteristics for each host in a cluster of hosts accessing a storage system, in accordance with one embodiment of the present disclosure.

FIG. 5 is a flow diagram 500 depicting a computer implemented method for load balancing, in which application and topology awareness along with differential clusterwide statistics are used to perform effective multi-layer load balancing of I/Os originating from a local host, wherein the load balancing includes delivery of I/Os to a local host as well as remote hosts, in accordance with one embodiment of the present disclosure. In another embodiment, flow diagram 500 is implemented within a computer system including a processor and memory coupled to the processor and having stored therein instructions that, if executed by the computer system causes the system to execute the method for load balancing. In still another embodiment, instructions for performing the method are stored on a non-transitory computer-readable storage medium having computer-executable instructions for causing a computer system to perform a method for load balancing as outlined by flow diagram 500. The method outlined in flow diagram 500 is implementable by the volume manager 420 of the host device 400 of FIG. 4, and as such is implemented at the volume level of storage management, in one embodiment.

The method outlined in flow diagram 500 is implemented in a cluster environment comprising one or more hosts that are configured to access a storage system, and more particularly are configured to access one or more LUNs of the storage system. In the cluster environment, each host can have multiple paths to the storage system. More particularly, each host can have multiple paths to the storage devices or LUNs, along with I/O load characteristics about the set of hosts in the cluster, through which an I/O originating at a local host is shipped or redirected to a remote host for delivery to the storage system.

At 510, at a volume manager of a local host, each of a plurality of hosts are discovered in a clustered environment comprising a plurality of hosts capable of accessing one or more LUNs of a storage system. The local host is configured to deliver and/or send I/Os to a storage system through a storage network fabric (e.g., Fibre Channel fabric switch network). For example, on a per I/O basis, the local host is configured to deliver an I/O to a particular LUN of the storage system through the storage network fabric.

Through the discovery process, host candidates are discovered that are capable of receiving redirected I/O from a local host for delivery to the underlying storage system. That is, the volume manager at the volume management level is cluster aware, in that hosts of the cluster are discovered by or made known to the volume manager. More specifically, host discovery is not performed at the multi-pathing layer but at the volume management layer. As such, challenges encountered with cluster awareness at the multipathing layer are avoided, such as, reconfiguration of the cluster each time a path and/or node enters or leaves the node. In that manner, load balancing at the multi-pathing layer is restricted to local I/O load balancing for the corresponding local host.

In one embodiment, the discovery process is performed at the multi-pathing layer. That is, the multi-pathing driver (e.g., driver 430 of FIG. 4) performs a dynamic multi-pathing connectivity check to determine iSCSI host devices that are present within the cluster. This host information is then shared with the volume manager for purposes of performing load balancing. In this case, the multi-pathing driver still performs load balancing at the local level once it is decided that an I/O is to be processed for delivery locally.

At 520, global I/O load characteristics are collected for each of the plurality of hosts in a cluster. Collection of the I/O load characteristics on a per host basis is performed at the device and/or volume level. As such, detailed information, such as, throughput and network latency, about a particular path is avoided, and instead a globalized version of I/O characteristics for the entire node is collected. For instance, I/O load characteristics at a particular node include I/O throughput, I/O response time, I/O load on a LUN as directed by the node, I/O load on the enclosure that supports the LUN, amount of I/O being served by the host bus adaptors or host controllers of the node, network traffic on the node and network traffic and/or latency between nodes (e.g., network latency between a corresponding host and the local host), overall system load/resource availability, the critical nature of the node in question, and awareness of the application performing the I/O to determine how sensitive is the I/O to latency.

At 530, load balancing is performed at the volume management layer by determining a selected host for processing an I/O originating at the local host based on a current set of the global I/O load characteristics. Load balancing is performed through a layered approach by the volume manager, wherein the volume manager includes functionality for load balancing I/Os, wherein the functionality is logically represented by an I/O balancer in the volume manager, and wherein the logical I/O balancer selects the target host. In summary, at a top layer, the I/O balancer determines whether to ship the I/O to a remote host or to process the I/O for delivery to the storage system locally. Next, once the I/O balancer decides to ship the I/O, a target host is determined based on favorable I/O load characteristics. Once received by the target host, local load balancing at the multi-pathing layer of the target host is performed. That is, once the I/O is delivered to the target host, the multi-pathing driver of the target host uses appropriate scheduling between available local paths associated with that node.

In one embodiment, differential clusterwide statistics are collected to drive the load balancing performed at the I/O balancer. That is, a determination on whether to ship the I/O to a remote host or to keep the I/O for processing by the local host is based on a current set of the global I/O characteristics. For instance, the determination to process the I/O locally at the local host is based on the current set of global I/O load characteristics, wherein the selected node comprises the local node. Also, the determination to process the I/O remotely at a remote node is also based on the global I/O load characteristics.

More particularly, the cluster-wide I/O characteristics or statistics are collected in a delayed amortized fashion. That is, the I/O characteristics are collected for the nodes at various times, and need not be fully collected to perform the load balancing. As such, a current set of I/O load characteristics for the hosts are used to perform load balancing. In some implementations, I/O characteristics for a node is collected on a delayed basis when compared to other nodes, wherein the delay as an example may range from a few seconds to a few minutes. For instance, the I/O balancing module will collect local I/O characteristics (e.g., CPU/memory/I/O/network subsystem information) on the local node, as well as collect the information from remote or peer hosts/nodes in the cluster (periodically).

As such, depending upon the aggregate load being served by the collection of hosts and the capacity of each host, it is determined if some I/O should be shipped to other nodes that are less loaded. Differential I/O load characteristics are considered when performing load balancing, wherein statistics collected in relation to a remote host is compared to statistics for the local host. That is, the remote host is selected based on favorable differential I/O load balancing statistics or characteristics that are determined in comparison to the local host. For instance, the load balancing considers the account benefits (e.g., additional throughput), and compares the benefits against the cost (e.g., additional latency, resource overheads) to determine if it makes sense to ship (minimal vs. significant imbalance). As an example, costs might be non-linear (i.e., higher costs/MB if the target node is heavily loaded or is a more critical resource).

To deal with transient issues, outstanding requests (local as well as remote targets) and response time are considered to throttle I/Os. To take into account load variations between medium and short term statistics that are collected cluster-wide, current values measured locally are used to make a decision on whether to ship the I/O.

Once it is determined to ship the I/O to a remote host, the remote host is then selected based on favorable I/O characteristics, in one embodiment. In another embodiment, protocols such as MinQ, or round-robin with random seed are selected to choose the target host/node (all other factors remaining same or similar). Additionally considerations may include the fact that other nodes might schedule I/Os to the same set of targets (based on a current trend), and as such, the local host sets a soft high watermark (revised time to time based on measured statistics) to not trigger cross node reciprocal I/O pattern, in one embodiment. In addition, when I/Os are received from a remote host to which the local host is shipping I/Os, the local host can throttle any outbound I/Os to the remote host in question in order to delay completion or for other purposes, and to make the remote node throttle its I/Os.

In one embodiment, to handle scenarios where I/O load is bursty in nature, or I/O load starts at the same time on each host/node, a randomized round robin approach is used over and above the protocols that make differential decisions based on I/O statistics. Every node seeds the randomized protocol differently and decided to not use some hosts/nodes while running the differential load balancing protocol. This ensures that all nodes in the cluster end up scheduling the I/Os to different hosts/nodes given the same I/O characteristics. Hence it handles the scenarios where there is a burst of I/Os from all the hosts/nodes.

Additionally, topology is used to determine whether to consider a remote host as a candidate for shipping I/O from the local host. If connectivity information is available, hosts that have no connectivity with the particular LUN of the storage system are not considered candidates. In that manner paths that are unavailable or are suspect are not considered. Further, site selectivity may be enforced, in which remote hosts belonging to the same site as the local host, or those that exhibit close physical proximity to the local host are selected for redirection of I/Os in order to minimize overhead, and possibly comply with policy requirements. A site includes one or more hosts that share a general geographic location, and are connected through dedicated network links (e.g., cables or lines) providing superior performance. Also, a multi-pathing component, based on information gained from performing local load balancing, may provide information related to the number and type of links available of a corresponding remote host. This information may indicate the available bandwidth (active/usable paths) for that remote host, and can also be used in cluster-wide load balancing or I/O scheduling.

Furthermore, the selection of a local or remote host for handling the I/O considers "application aware" load balancing. That is, I/Os that are latency sensitive and/or high priority are scheduled over the path exhibiting the best or most favorable I/O characteristics. Typically, the path exhibiting the most favorable I/O characteristics is a local path, but may be a remote path depending on the situation. Similarly, low priority I/Os (e.g., administrative I/Os) are assigned to high cost paths, even if it means additional delay in scheduling and/or additional network latency in its delivery to the storage system. Also, bandwidth can be reserved to allow high priority applications such as heartbeat or cluster-wide protocols to get higher precedence when handling their I/Os. Further, where caching at a disk driver makes sense (sequential I/O, etc) or does not make sense (I/Os to swap/log volume) may affect the load balancing or scheduling decisions on where to ship the I/O. For additional consideration, requests that require additional resources (locks, memory, CPU) are best served on nodes that can support those features, which translates to lesser costs. Additionally, storage/network characteristics may be considered when handling load balancing for reads and writes, such that they may be handled differently Once the host is selected, an I/O from the local host is shipped or redirected to the available, remote host for purposes of delivering the I/O to the storage system over the storage network fabric. The I/O is redirected to the available, remote host through a secondary communication network, as will be shown in FIG. 7. The secondary communication network is used primarily for host to host communication, and is used in embodiments of the present disclosure for redirecting I/O between hosts. Thereafter, the I/O is delivered to the storage system from the available, remote host on behalf of the local host. In addition, any messages sent in response to the redirected I/O is delivered back through the available, remote host and to the originating, local host. That is, the response message is received by the local host over the secondary communication network from the storage system and via the available, remote host.

Figure 6:
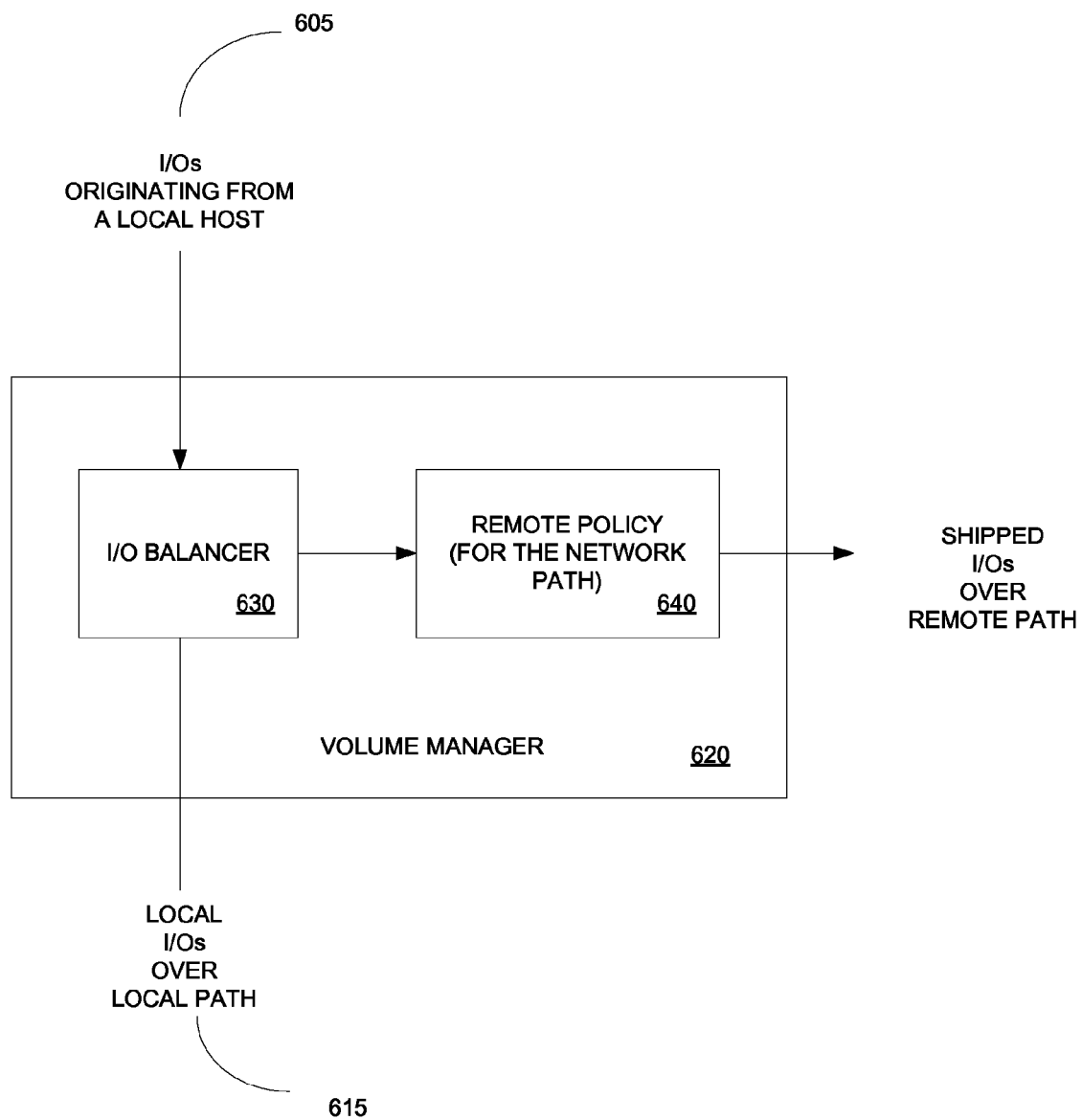
FIG. 6 is a data flow diagram depicting the flow of I/Os through a volume manager that is configured to perform load balancing to include redirecting I/Os to a remote host based on I/O load characteristics collected for each host in a cluster of hosts capable of accessing a storage system, in accordance with one embodiment of the present disclosure.

FIG. 6 is a data flow diagram 600 depicting the flow of I/Os through a volume manager 620 that is configured to perform load balancing to include redirecting I/Os 605 to a remote host (not shown) based on I/O load characteristics collected for each host in a cluster of hosts capable of accessing a storage system, in accordance with one embodiment of the present disclosure. The volume manager 620 is capable of performing multi-layered load balancing that considers application and topology awareness along with differential clusterwide statistics.

A logical module named I/O balancer 630 within the volume manager 620 is used to load balance and/or schedule the I/Os over network paths. That is, the volume manager 620 includes functionality for load balancing I/Os, wherein the functionality is logically represented by the I/O balancer 630. First and foremost the I/O balancer 630 is capable of deciding whether to handle the I/Os 605 locally or schedule I/Os to on another node, wherein the I/Os originate from a local host. This load balancing is performed on an I/O by I/O basis, or on a group of related I/Os, in embodiments. This decision on whether to ship is based on I/O load characteristics collected by the I/O balancer 630, as previously described. Once an I/O is to be shipped, a target host is selected based on a current set of global I/O load characteristics collected for each host in the cluster.

In one embodiment, both local and network paths are maintained at the volume manager of the local host. This requires that multiple path policies are maintained within the disk structure at the volume management layer. The path policy within the disk structure is used to maintain the entry points to strategy calls and maintain I/O statistics information. Once the disk structure is extended within the volume management layer, I/Os can be scheduled either to local paths or network paths simultaneously and in parallel.

Once the I/O is scheduled for handling at the local host, the I/O is sent to the multi-pathing driver of the local host for selection of handling of the I/O over a local path 615. That is, local load balancing is performed at the multi-pathing layer of the local host. For example, cluster-wide statistics reflecting global I/O load characteristics are collected on the local host using per-node data structure.

Similarly if the I/O is scheduled to network path in association with a remote host, the I/O goes through a load balancing scheme within the remote path policy module 640. In one embodiment, a generic load balancing scheme is adopted at the I/O balancer 620 (which acts as an interface to local or remote path policies). Clusterwide statistics reflecting global I/O load characteristics are collected and on the local host device using a per-node data structure, for example. New interfaces can be added to track node/network statistics to be used by I/O balancer 630.

The volume manager 620, and more specifically the I/O balancer 630 effectively forms the multi layer load balancing architecture as described in embodiments of the present disclosure. The load balancing architecture considers cluster-wide I/O load characteristics for each of the hosts/nodes in a cluster capable of accessing a storage system. As a result, the architecture provides superior load balancing that a load balancing scheme limited to the multi-pathing layer cannot handle. Specifically, the load balancing architecture considers differential cluster-wide I/O characteristics in relation to a local host to load balance I/O handling by local or remote paths. As such, load balancing occurs across a set of hosts/nodes of a cluster. Further, existing mechanisms are used to load balance or schedule at the local level.

The I/O balancer 630 is configured to provide multi-layer load balancing that considers application and topology awareness along with differential cluster-wide statistics. In particular, in one embodiment, load balancing is performed at the volume layer so that the multipathing layer is not complicated by introducing multiple variables, such as, maintaining a configuration for local and remote nodes including current primary paths as seen through each node within the cluster, such as, for active/passive arrays.

In addition, the configuration of the I/O balancer 630 eliminates the requirement to maintain up-to-date cluster-wide I/O counts on each node of the cluster. This reduces the number of messages exchanged across multiple nodes. Moreover, the I/O statistics and/or load characteristics information is used differently than it is used by the multipathing layer, wherein the multi-pathing driver is almost always aware of the number of I/Os on a path as soon as they are scheduled. In a clustered environment, the I/O load characteristics information is used to make delayed differential decisions so that some paths are used less frequently because of its high I/O load characteristics. In one embodiment, I/O load characteristics are particularly used for load balancing in a steady state environment where there are limited or no bursts in I/O patterns from different hosts/nodes.

Furthermore, I/O prioritization and handling latency sensitive I/Os is implemented within the I/O balancer 630, in one embodiment. For instance, priority is given to choosing local paths for I/Os with higher priority or that are latency sensitive. Remaining I/Os are more likely to be chosen to be shipped. This in turn improves the turnaround time, given that local paths are faster and less prone to failure compared to network paths.

In still another embodiment, throttling is implemented by the I/O balancer 630 by introducing payloads that come with each I/O completion. A limit is set defining the number of I/Os that a target host can take. This gets collected at each local or source host/node.

In embodiments of the present disclosure, the I/O balancer 630 provides an ideal layer to make the decisions regarding locality of the I/O requests. Thus, I/O requests are scheduled in a manner that overlap regions to the same node. Given that a volume management layer is usually aware of the regions where I/O requests are made, the I/O balancer 630 accesses the volume manager at the volume management layer to appropriately extract the information from the I/O buffer for use in load balancing.

In addition, the I/O balancer 630 can determine not to ship the I/Os to hosts/nodes that have already shipping their local I/Os to other nodes. Moreover each target host/node that is remote may have a limit on the I/Os it can service (e.g., based on the available memory, outstanding I/Os and SCSI throttle limit, etc.). This metadata information is exchanged within the I/O balancer 630, instead of adding these variables within the multipathing layer.

Moreover, in other embodiments higher priority is given to reads handled locally, and writes handled over network paths. This may unblock related I/Os that are dependent on a corresponding read that are finished sooner. Specifically, write latency is typically lower than read latency due to caching in the array. Because read operations can access information stored in cache, the overall impact on latency by read operations is lower. In one embodiment, write I/Os are handled locally at the local host, and read I/Os are shipped for handling at a remote host. Application requirements dictating the sensitivity to latency for a particular I/O is also considered.

Figure 7:
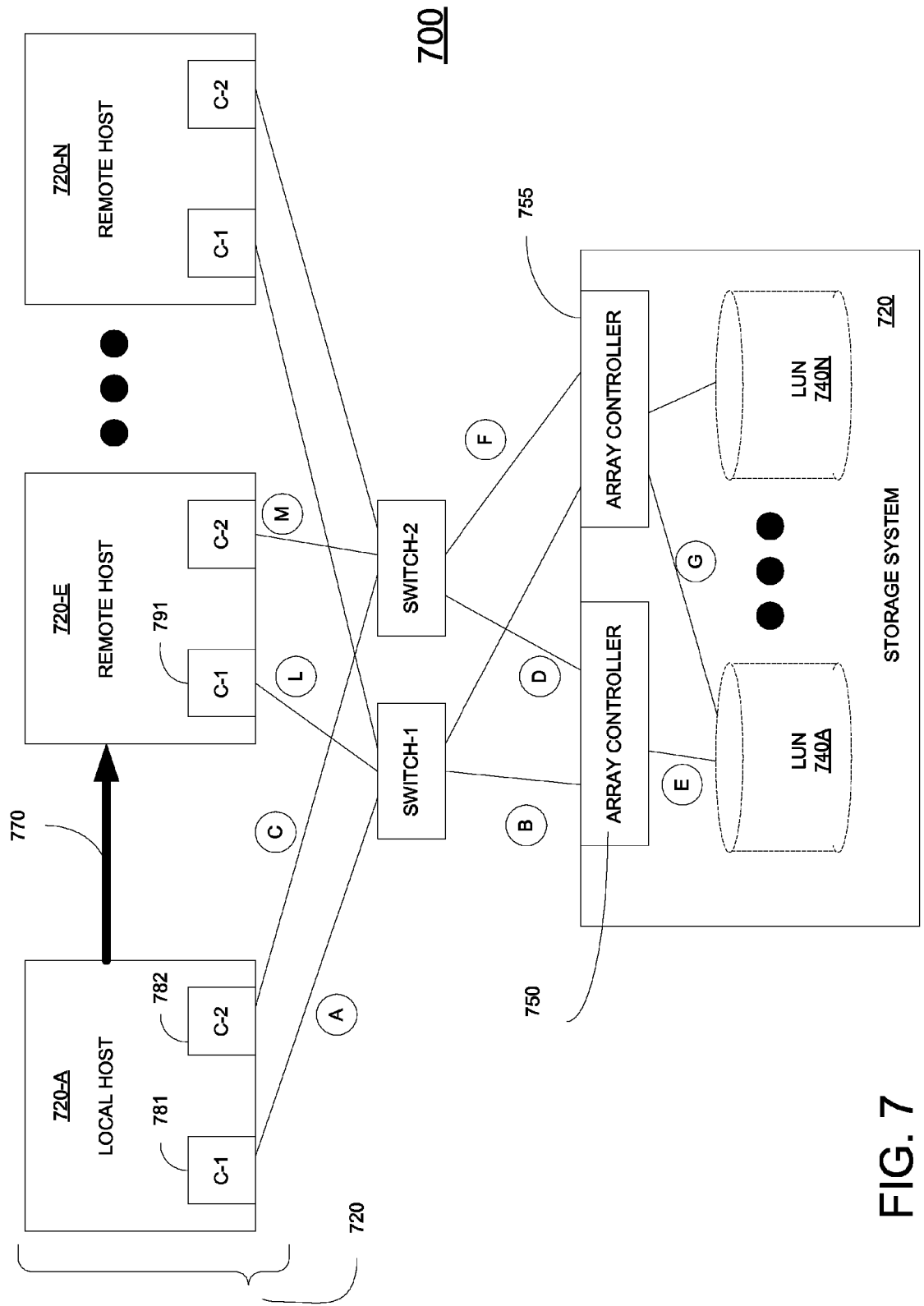
FIG. 7 is a data flow diagram depicting the multiple paths available to a local host for delivery of an I/O originating at the local host and targeted for a storage system, in accordance with one embodiment of the present disclosure.

FIG. 7 is a data flow diagram 700 depicting connectivity between a plurality of hosts 720A-N and a storage system primary array controller 750 and secondary array controller 755 of a storage system 720 and the redirecting of I/Os from the local host 720A to a remote host 720E, in accordance with one embodiment of the present disclosure. For purpose of illustration, configuration of a local host 720A for accessing a storage system 720 is shown. Also an exemplary storage system 720 includes a plurality of LUNs 740A-N, in which LUN 740A is accessed by local host 720A and one or more remote hosts.

The configuration shown in FIG. 7 is used to illustrate one of many communication configurations for providing communication between a plurality of hosts and a storage system 720 for accessing LUN 640A. As shown, communication between the local host 710 and the storage system is provided by one or more storage network fabrics, such as those through switch-1 and/or switch-2. More particularly, local host includes two host controllers C-1 781 and C-2 782. In one configuration, C-1 781 and C-2 782 are primary host controllers. In another configuration, C-1 781 is a primary host controller, and C-2 782 may is a secondary host controller. A primary host controller is used to support the active paths to the storage system 720. On the other hand, a secondary host controller is used to support secondary or backup paths to the storage system 720.

For purposes of illustration only, one or more active paths to LUN 740A from local host 720A may be defined by path sections A-B-E; A-D-G; C-D-E; and C-F-G. Not all paths are shown in FIG. 7. The storage network fabric includes switch-1 and switch-2. Similarly, one or more active paths to the same LUN 740A is shown in association with remote host 720E. For instance, one or more active paths to LUN 740A may be defined by path sections L-B-E; L-D-G; M-D-E; and M-F-G.

As such, in relation to local host 720A, one or more local paths are available providing connectivity between local host 720A and LUN 740A. Also, one or more remote paths are available providing connectivity to remote host 720E and LUN 740A. Remote host 720E includes two host controllers (e.g., host controller 791). In particular, for purposes of performing load balancing at local host 720A, embodiments of the present disclosure are able to perform multi-layer load balancing that considers application and topology awareness along with differential cluster-wide statistics.

As such, cluster-wide load balancing of I/Os at the local host 720A is possible since the volume manager of the local host 720A is aware of the local and remote paths for accessing LUN 740A, as previously described. In particular, local host handling of I/Os is shown, wherein I/Os originating from local host 720A are delivered to the storage system 720, and more particularly to LUN 740A of storage system 720 via the local host 720A. In addition, selection of a remote host 720E to handle redirected I/Os delivered from the local host 720A to the remote host 720 over path 770 is also shown in FIG. 7 providing connectivity over one or more active paths to LUN 740A of storage system 720.

Thus, according to embodiments of the present disclosure, systems and methods are described in which I/Os from a local host are redirected to an available remote host that is capable of delivering I/Os to an array controller of a storage system, wherein the load balancing is based on global I/O characteristics collected for each of a plurality of hosts accessing the storage system. Further, embodiments of the present disclosure provide for multi-layer load balancing that considers application and topology awareness along with differential cluster-wide statistics.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer implemented method for load balancing, comprising:
    at a local volume manager associated with a local host, discovering each of a plurality of remote volume managers, wherein each remote volume manager is associated with a remote host of a plurality of hosts in a cluster, wherein said plurality of hosts is configured for accessing a LUN of a storage system through a storage network fabric;
    at said local volume manager, collecting global I/O load characteristics from each remote volume manager for each corresponding associated remote host of said plurality of hosts in said cluster; and
    determining a selected host for processing an I/O originating at said local host based on a current set of said global I/O load characteristics and on a rate of received I/O from each remote volume manager for said each corresponding associated remote host of said plurality of hosts in said cluster.

2. The computer implemented method of claim 1, wherein determining the selected host comprises:
    determining to ship said I/O from said local host based on said current set of said global I/O load characteristics to said selected host comprising a remote host; and
    selecting said remote host from one or more remote hosts based on favorable differential I/O load balancing statistics determined in comparison to said local host; and
    redirecting said I/O from said first host to said remote host.

3. The computer implemented method of claim 1, wherein said global I/O load characteristics is taken from a group consisting of I/O throughput, I/O response time, network latency between a corresponding remote host and said local host, I/O load at each of said plurality of hosts, and resource availability.

4. The computer implemented method of claim 1, further comprising:
    determining to process said I/O at said LUN based on said current set of said global I/O load characteristics, wherein said selected host comprises said LUN;
    at a multi-pathing driver of said local host, performing local load balancing to assign said I/O to a selected path of one or more local communication paths accessing said LUN.

5. The computer implemented method of claim 1, wherein said determining a selected host further comprises:
    determining said selected host having the best I/O load characteristics for an I/O having a high priority.

6. The computer implemented method of claim 1, wherein said determining a selected host further comprises:
    determining said selected host having the poorest I/O load characteristics for said I/O having a low priority.

7. The computer implemented method of claim 1, further comprising:
    collecting values of said current set of said global statistics in a delayed and amortized fashion for said plurality of hosts.

8. The computer implemented method of claim 1, further comprising:
    providing a plurality of default values for said global statistics.

9. A computer system, comprising:
a processor; and
memory coupled to said processor and having stored therein instructions that, if executed by said computer system, cause said computer system to execute a method for load balancing, comprising:
    at a local volume manager associated with a local host, collecting global I/O load characteristics from each remote volume manager of a plurality of remote volume managers, wherein each remote volume manager is associated with a remote host of a plurality of remote hosts in a cluster, wherein said plurality of remote hosts are configured for accessing a LUN of a storage system through a storage network fabric; and
    determining a selected host for processing an I/O originating at said local host based on a current set of said global I/O load characteristics and on a rate of received I/O from each remote volume manager for said each corresponding associated remote host of the plurality of remote hosts in said cluster.

10. The computer system of claim 9, wherein determining the selected host comprises:
- determining to ship said I/O from said local host based on said current set of said global I/O load characteristics to said selected host comprising a remote host; and
- selecting said remote host from one or more remote hosts based on favorable differential I/O load balancing statistics determined in comparison to said local host; and
- redirecting said I/O from said first host to said remote host.

11. The computer system of claim 9, wherein in said method said global I/O load characteristics is taken from a group consisting of I/O throughput, I/O response time, network latency between a corresponding remote host and said local host, I/O load at each of said plurality of hosts, and resource availability.

12. The computer system of claim 9, wherein said method further comprises:
- determining to process said I/O at said LUN based on said current set of said global I/O load characteristics, wherein said selected host comprises said LUN; and
- at a multi-pathing driver of said local host, performing local load balancing to assign said I/O to a selected path of one or more local communication paths accessing said LUN.

13. A non-transitory computer-readable storage medium having computer-executable instructions for causing a computer system to perform a method for load balancing, comprising:
- at a local volume manager associated with a local host, collecting global I/O load from each remote volume manager of a plurality of remote volume managers, wherein each remote volume manager is associated with a remote host of a plurality of remote hosts in a cluster, wherein said plurality of remote hosts are configured for accessing a LUN of a storage system through a storage network fabric; and
- determining a selected host for processing an I/O originating at said local host based on a current set of said global I/O load characteristics and on a rate of received I/O from each remote volume manager for said each corresponding associated remote host of said plurality of remote hosts in the said cluster.

14. The computer-readable storage medium of claim 13, wherein determining the selected host comprises:
- determining to ship said I/O from said local host based on said current set of said global I/O load characteristics to said selected host comprising a remote host; and
- selecting said remote host from one or more remote hosts based on favorable differential I/O load balancing statistics determined in comparison to said local host; and
- redirecting said I/O from said first host to said remote host.

15. The computer-readable storage medium of claim 13, wherein said global I/O load characteristics is taken from a group consisting of I/O throughput, I/O response time, network latency between a corresponding remote host and said local host, I/O load at each of said plurality of hosts, and resource availability.

16. A computer-readable storage medium of claim 13, wherein said method further comprises:
- determining to process said I/O at said LUN based on said current set of said global I/O load characteristics, wherein said selected host comprises said LUN; and
- at a multi-pathing driver of said local host, performing local load balancing to assign said I/O to a selected path of one or more local communication paths accessing said LUN.

17. The computer-readable storage medium of claim 13, wherein said determining a selected host further comprises:
- determining said selected host having the best I/O load characteristics for an I/O having a high priority.

18. The computer-readable storage medium of claim 13, wherein said determining a selected host further comprises:
- determining said selected host having the poorest I/O load characteristics for said I/O having a low priority.

19. The computer-readable storage medium of claim 13, wherein said method further comprises:
- collecting values of said current set of said global statistics in a delayed and amortized fashion for said plurality of hosts.

20. The computer-readable storage medium of claim 13, wherein said method further comprises:
- providing a plurality of default values for said global statistics.

21. A computer-implemented method for load balancing comprising:
- receiving, at a local load balancer associated with a local host in a cluster, input/output load characteristics of at least one remote load balancer associated with a remote host in the cluster;
- measuring a rate of receiving remote input/output requests from the at least one remote load balancer; and
- throttling the rate of sending local input/output requests to the at least one remote host based on the input/output load characteristics of the at least one remote host and on the rate of receiving remote input/output requests from the at least one remote host.

* * * * *